United States Patent
Kuehnel

(10) Patent No.: US 7,263,540 B1
(45) Date of Patent: Aug. 28, 2007

(54) METHOD OF GENERATING MULTIPLE RANDOM NUMBERS

(75) Inventor: Richard J. Kuehnel, Stuttgart (DE)

(73) Assignee: The United States of America as represented by the Director National Security Agency, Washington, DC (US)

( * ) Notice: Subject to any disclaimer, the term of this patent is extended or adjusted under 35 U.S.C. 154(b) by 766 days.

(21) Appl. No.: 10/794,546

(22) Filed: Mar. 3, 2004

(51) Int. Cl.
*G06F 7/58* (2006.01)

(52) U.S. Cl. ..................................... 708/256
(58) Field of Classification Search .................. 708/256
See application file for complete search history.

(56) References Cited

U.S. PATENT DOCUMENTS

| | | | |
|---|---|---|---|
| 5,153,532 A * | 10/1992 | Albers et al. ................. 331/78 |
| 5,251,165 A | 10/1993 | James, III | |
| 5,570,307 A * | 10/1996 | Takahashi ................... 708/256 |
| 5,793,657 A | 8/1998 | Nemoto | |
| 5,796,776 A * | 8/1998 | Lomp et al. ................. 375/222 |
| 6,253,223 B1 | 6/2001 | Sprunk | |
| 6,480,870 B1 | 11/2002 | Park | |
| 7,124,158 B2 * | 10/2006 | Ruthstein et al. ........... 708/256 |
| 7,142,675 B2 * | 11/2006 | Cheng et al. ................. 380/46 |
| 2003/0014451 A1 * | 1/2003 | Peyser et al. ............... 708/250 |

OTHER PUBLICATIONS

Joshua Alspector et al., "A VLSI-Efficient Technique for Generating Multiple Uncorrelated Noise Sources and its Application to Stochastic Neural Networks," *IEEE Transactions on Circuits and Systems*, vol. 38, No. 1, Jan. 1991.

* cited by examiner

*Primary Examiner*—D. H. Malzahn
(74) *Attorney, Agent, or Firm*—Robert D. Morelli

(57) ABSTRACT

A device for and method of generating as many as K random bits by generating a first pseudo-random bit, generating a second pseudo-random bit, delaying the second pseudo-random bit a number of times, storing the delayed pseudo-random bits, and combining the first pseudo-random bit with each of the delayed second pseudo-random bits.

8 Claims, 2 Drawing Sheets

METHOD OF GENERATING MULTIPLE RANDOM NUMBERS

FIELD OF THE INVENTION

This invention relates to electrical computer arithmetic processing and calculating, and, more particularly, to random number generation.

BACKGROUND OF THE INVENTION

The simulation of a stochastic process, whose outcome is probabilistic in nature, requires the use of a random, or pseudo-random, number. Hereinafter, the term "random number" will be used to denote both a truly random number and a pseudo random number. A statistical computing system such as a stochastic neural network requires a large number (e.g., thousands) of random numbers. When multiple random numbers were required to be independent, separate random number generators were employed, often requiring different algorithms for each random number generator. Presently, integrated circuits perform mathematical operations for a system. Integrating large numbers of random number generators onto an integrated circuit is inefficient and costly at best and impossible at worst. In addition, separate random number generators may only produce one random bit per clock cycle. There is a need for a device and method that generates multiple random bit sequences, where multiple bits are produced per clock cycle, that is simple to design and easily expanded to add additional random bit sequences.

In an article by Joshua Alspector, et al., entitled "A VLSI-efficient technique for generating multiple uncorrelated noise sources and its application to stochastic neural networks," *IEEE Transactions On Circuits and Systems*, January 1991, Vol. 38, No. 1, pp. 109-123, a method is disclosed of generating multiple bit sequences from a single pseudo-random bit generator by tapping a shift register of the pseudo-random bit generator. Specifically, three taps are made for each random bit sequence required, where each set of taps is modulo 2 added to produce a time-shifted version of the random sequence produced by the pseudo-random bit generator. Different combinations of taps produce different time-shifts of the random sequence of the pseudo-random bit generator. The amount of time-shifting between sequences must be sufficient to consider the sequences uncorrelated. One drawback to this method is that the pseudo-random bit generator must be sufficiently large to allow for sufficiently different time-shifts to be selected so that the results are uncorrelated. In addition, there remains difficulty in routing unique combinations of taps on an integrated circuit, computing time-shifts for each sequence, and having to design a new time shift whenever a new sequence is required.

U.S. Pat. No. 5,251,165, entitled "TWO PHASE RANDOM NUMBER GENERATOR," discloses a device for and method of generating a random number by generating a first random number in a first phase and then using this first random number to generate two more random numbers in a second phase. One of the two random numbers generated in the second phase is selected, based on a bit value in the random number generated in the first phase. The present invention does not use such a method. U.S. Pat. No. 5,251,165 is hereby incorporated by reference into the specification of the present invention.

U.S. Pat. No. 5,793,657, entitled "RANDOM NUMBER GENERATING APPARATUS AND RANDOM NUMBER GENERATING METHOD IN A MULTIPROCESSOR SYSTEM," discloses a device for and method of generating a random number in a multiprocessor system that allows for the number of processors to change. It does so by setting an initial value in each processor in the system from which each processor generates a random number. The random numbers then make a sequence of random numbers. If a processor is added to the system, all of the processors are reset, initial values are set in the processors, the processors generate random numbers, and the random numbers are used as a sequence of random numbers. The present invention does not use such a method. U.S. Pat. No. 5,793,657 is hereby incorporated by reference into the specification of the present invention.

U.S. Pat. No. 6,253,223, entitled "ROBUST RANDOM NUMBER GENERATOR," discloses a device for and method of generating a random number by producing a first random number from an analog random number generator, producing a pseudo-random number from a digital random number generator, and combining the two random numbers to produce a final random number. The present invention does not use such a method. U.S. Pat. No. 6,253,223 is hereby incorporated by reference into the specification of the present invention.

U.S. Pat. No. 6,480,870, entitled "RANDOM NUMBER GENERATOR USING LEHMER ALGORITHM," discloses a device for and method of generating a random number by using a plurality of bit generators to produce a plurality of sum bits and a plurality of carry bits. The carry bits are converted to a three-bit number which is then added to the sum bits to produce a random number. The present invention does not use such a method. U.S. Pat. No. 6,480,870 is hereby incorporated by reference into the specification of the present invention.

SUMMARY OF THE INVENTION

It is an object of the present invention to generate a plurality of random bits using only two pseudo-random bit generators.

It is another object of the present invention to generate a plurality of random bits in a manner that is efficient to route on an integrated circuit.

It is another object of the present invention to generate a plurality of random bits in a manner that is mathematically and administratively efficient.

The present invention is a device for and method of generating random bits. A first pseudo-random bit generator generates a first bit. A second pseudo-random bit generator generates a second bit. The second bit is delayed a user-definable number of times. Each delayed version of the second bit is combined with the first bit to produce a sequence of random bits. The process is repeated if additional random bits are required.

DETAILED DESCRIPTION

The present invention is a device for and method of generating random bits. The device and method are especially suited for generating random bits on an integrated circuit because they only require the use of two pseudo-random bit generator functions, the routing connections are easily implemented (e.g., daisy-chaining or abutment), and the required circuit elements are minimal and easily implemented.

Figure 1:
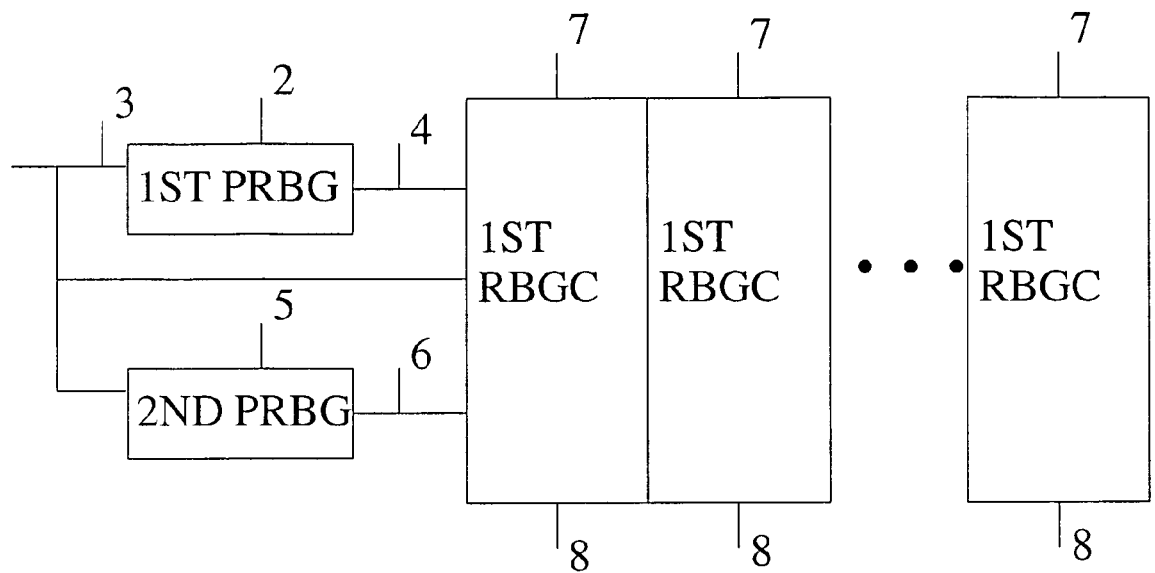
FIG. 1 is a schematic of the device of the present invention.

FIG. 1 is a schematic of the random-number generator 1 of present invention. The random number generator 1 is for generating a user-definable number of random bits for any process that requires such bits (e.g., stochastic processes).

The random-number generator 1 includes a first pseudo-random bit generator 2 (PRBG). The first pseudo-random bit generator 2 has a clock input 3 and an output 4. In the preferred embodiment, the first pseudo-random bit generator 2 steps, upon application of a clock signal to the clock input 3, as a polynomial that repeats every S bits, where S is a user-definable positive integer, where S>K, and where K is the maximum number of random bits for which the present invention is designed to generate. Since the present invention is designed to accommodate expansion, K must be larger than the number of random bits required for any particular application. For example, if a designer needed 100 random bits buts wishes to expand the design later then the designer might want to set K equal to 1000. In an alternate embodiment, the first pseudo-random bit generator 2 is stepped as a primitive polynomial, an irreducible polynomial, or both.

The random number generator 1 includes a second pseudo-random bit generator 5. The second pseudo-random bit generator 5 has a clock input connected to the clock input 3 of the first pseudo-random bit generator 2, and has an output 6. In the preferred embodiment, the second pseudo-random bit generator 5 steps, upon application of a clock signal to its clock input, as a polynomial that repeats every T bits, where T is a user-definable positive integer, where T>K, and where T and S are relatively prime. In an alternate embodiment, the second pseudo-random bit generator 5 is stepped as a primitive polynomial, an irreducible polynomial, or both.

The random number generator 1 includes a user-definable number of random-bit generation cells 7 daisy-chained or abutted. By connecting the random-bit generation cells 7 this way, routing connectivity is made maximally efficient. The number of random-bit generation cells 7 is equal to the number of random bits a designer requires for a particular application. The number of random-bit generation cells 7 selected by a designer may be viewed in groups. That is, the designer may need eight random bits for one function on an integrated circuit but twelve for another function on the same integrated circuit. The designer would then select twenty random-bit generation cells 7 for use on the integrated circuit and route the random-bits generated there from as required. The number of random-bit generation cells 7 used may not exceed K and, to accommodate expansion, should be less than K by a reasonable design margin.

Figure 2:
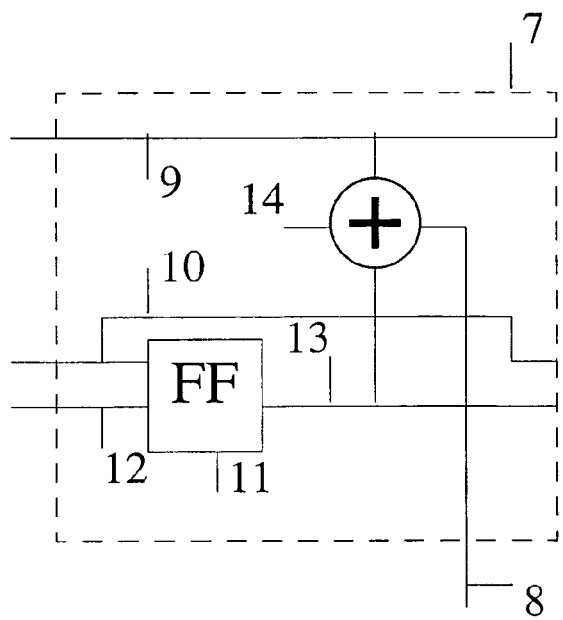
FIG. 2 is a schematic of the random-bit generation cell of FIG. 1.

The first of the random-bit generation cells 7 (RBGC) in the chain is connected to the clock input 3 of the first pseudo-random bit generator 2 and the outputs 4, 6 of the first and second pseudo-random bit generators 2, 5. The rest of the random-bit generation cells 7 are connected in daisy-chain or abutment fashion. Each random-bit generation cell 7, except the first random-bit generation cell 7 in the chain, gets its inputs from the previous random-bit generation cell 7 in the chain. The wiring of each random-bit generation cell 7 is shown in FIG. 2 and described in more detail below. Each of the random-bit generation cells 7 has a random-bit output 8 at which appears the random bit generated in that random-bit generation cell 7.

FIG. 2 is a schematic of each of the random-bit generation cells 7. A first input 9 of the random-bit generation cell 7, which in the first random-bit generation cell 7 in the chain is connected to the output 4 of the first pseudo-random bit generator 2, passes through the random-bit generation cell 7 and connectively aligns with the first input 9 of the random-bit generation cell 7 that follows next in the chain. That way, a random bit generated by the first pseudo-random bit generator 4 is simultaneously available to each of the random-bit generation cells 7 in the chain.

A clock input 10 of the random-bit generation cell 7 in FIG. 2, which in the first random-bit generation cell 7 in the chain is connected to the clock input 3 of the first pseudo-random bit generator 2, passes through the random-bit generation cell 7 and connectively aligns with the clock input 10 of the next random-bit generation cell 7 in the chain and is also connected to a clock input of a flip-flop 11. The flip-flop 11 has an input 12 and an output 13. In the first random-bit generation cell 7 in the chain, the input 12 is connected to the output 6 of the second pseudo-random bit generator 5. In subsequent random-bit generation cells 7, the input 12 is connected to the output 13 of the immediately preceding random-bit generation cell 7.

The first input 9 of the random-bit generation cell 7 is connected to a first input of a non-linear combination function 14. In the preferred embodiment, the non-linear combination function 11 is an exclusive-or function. The output 13 of the flip-flop 11 in the random-bit generation cell 7 is connected to the second input of the non-linear combination function 14. The output of the non-linear combination function 14 is the random-bit output 8 of the random-bit generation cell 7.

Figure 3:
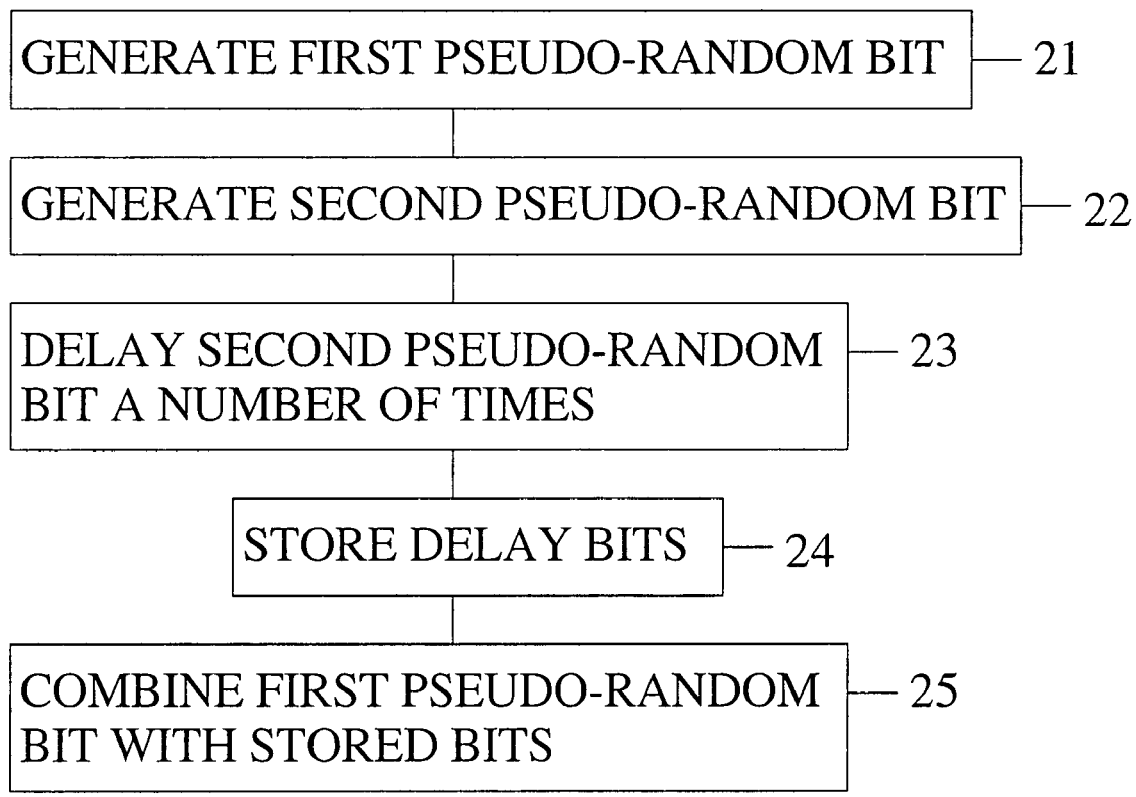
FIG. 3 is a list of steps of the present invention.

FIG. 3 is a list of steps of the present method. The first step 21 is generating a first pseudo-random bit using a polynomial that repeats every S bits, where S is a user-definable positive integer, where S>K, and where K is a user-definable positive integer that represents the maximum number of available random bits. In an alternative embodiment, the step of generating a first pseudo-random bit using a polynomial includes generating a first pseudo-random bit using a polynomial that is a primitive polynomial, an irreducible polynomial, or both.

The second step 22 is generating a second pseudo-random bit using a polynomial and repeats every T bits, where T is a user-definable positive integer, where T>K, and where T and S are relatively prime. In an alternative embodiment, the step of generating a second pseudo-random bit using a polynomial includes generating a second pseudo-random bit using a polynomial that is a primitive polynomial, an irreducible polynomial, or both.

The third step 23 is delaying the second pseudo-random bit a user-definable number of times, where the number of times equals the number of random bits the user requires.

The fourth step 24 is storing each delay of the second pseudo-random bit.

The fifth, and final, step 25 is combining the first pseudo-random bit with each of the stored and delayed second pseudo-random bits. In an alternative method, the step of combining the first pseudo-random bit with each of the delayed second pseudo-random bits is comprised of combining by exclusive-or function the first pseudo-random bit with each of the delayed second pseudo-random bits.

What is claimed is:

1. A device for generating as many as K random bits, where K is a user-definable positive integer, comprising:
   (a) a first pseudo-random bit generator, having a clock input, having an output, where the first pseudo-random bit generator steps as a polynomial and repeats every S bits, where S is a user-definable positive integer, and where S>K;

(b) a second pseudo-random bit generator, having a clock input connected to the clock input of the first pseudo-random bit generator, having an output, where the second pseudo-random bit generator steps as a polynomial and repeats every T bits, where T is a user-definable positive integer, where T>K, and where T and S are relatively prime;

(c) a plurality of random-bit generation cells connected in daisy-chain fashion, where each of said plurality of random-bit generation cells is comprising of:

(i) a non-linear combination function, having a first input connected to the output of the first pseudo-random bit generator and a first input of a combination function in an immediately following one of said plurality of random-bit generation cells, having a second input, and having an output; and (ii) a flip-flop, having an input connected to the output of said second pseudo-random bit generator, having a clock input connected to the clock input of the first pseudo-random bit generator and a clock input of a flip-flop in the immediately following one of said plurality of random-bit generation cells, and having an output connected to the second input of the combination function and an input of the flip-flop in the immediately following one of said plurality of random-bit generation cells.

2. The device of claim 1, wherein said first pseudo-random bit generator is selected from the group of pseudo-random bit generators consisting of pseudo-random bit generators that step as a primitive polynomial, an irreducible polynomial, and a combination thereof.

3. The device of claim 1, wherein said second pseudo-random bit generator is selected from the group of pseudo-random bit generators consisting of pseudo-random bit generators that step as a primitive polynomial, an irreducible polynomial, and a combination thereof.

4. The device of claim 1, wherein said non-linear combination function is an exclusive-or function.

5. A method of generating as many as K random bits, where K is a user-definable positive integer, comprising the steps of:

(a) generating a first pseudo-random bit using a polynomial that repeats every S bits, where S is a user-definable positive integer, and where S>K;

(b) generating a second pseudo-random bit using a polynomial and repeats every T bits, where T is a user-definable positive integer, where T>K, and where T and S are relatively prime;

(c) delaying the second pseudo-random bit a plurality of times;

(d) storing said plurality delays of said second pseudo-random bit; and (e) combining the first pseudo-random bit with each of said plurality of delays of said second pseudo-random bit.

6. The method of claim 5, wherein the step of generating a first pseudo-random bit is comprised of the step of generating a first pseudo-random bit using a polynomial selected from the group of polynomials consisting of primitive polynomial, irreducible polynomial, and a combination thereof.

7. The method of claim 5, wherein the step of generating a second pseudo-random bit is comprised of the step of generating a second pseudo-random bit using a polynomial selected from the group of polynomials consisting of primitive polynomial, irreducible polynomial, and a combination thereof.

8. The method of claim 5, wherein the step of combining the first pseudo-random bit with each of said plurality of delays of said second pseudo-random bit is comprised of the step of combining by exclusive-or the first pseudo-random bit with each of said plurality of delays of said second pseudo-random bit.

* * * * *